July 23, 1957  A. H. J. DE LASSUS ST-GENIÈS  2,800,064
METHOD FOR COPYING RELIEF IMAGES TAKEN ON LENTICULATED FILM
Filed March 23, 1954
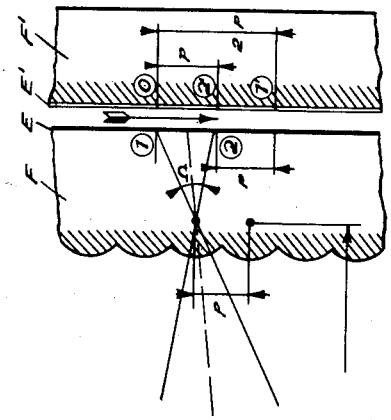
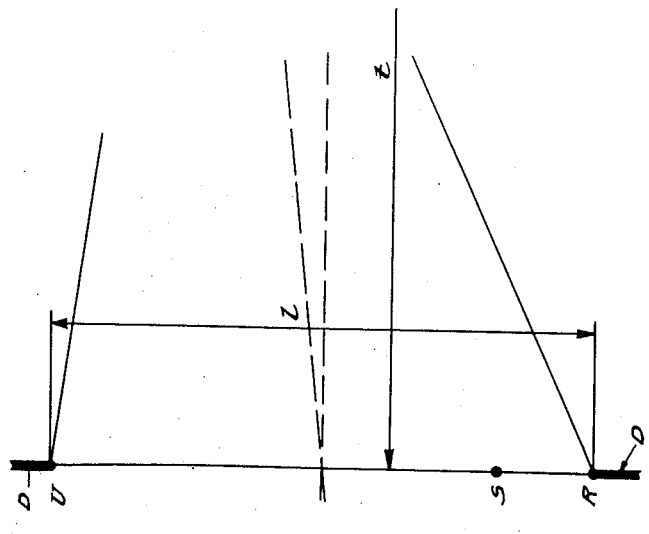
INVENTOR
ANNE HENRI JACQUES de LASSUS ST GENIES,
BY Stone, Boyden & Mack.
ATTORNEYS United States Patent Office 2,800,064
Patented July 23, 1957

2,800,064

METHOD FOR COPYING RELIEF IMAGES TAKEN ON LENTICULATED FILM

Anne Henri Jacques de Lassus St.-Geniès, Paris, France

Application March 23, 1954, Serial No. 418,205

Claims priority, application France March 25, 1953

5 Claims. (Cl. 95—75)

The present invention has for its object to copy relief images taken on lenticulated film, more particularly in the case of medium and large sizes.

In the specification hereinafter, the term "lenticulated film" will be used without any restriction, for designating in a wide sense any support, one side of which is coated with an emulsion, the other side being lenticulated or covered with a thin transparent lenticulated sheet.

When the transparent lenticulated sheet is separable from the support, it will hereinafter be designated by the term "selector."

It is known that a lenticulated film, exposed in a still camera or motion picture camera, records without discontinuity and without mutual overlapping elementary microscopic images having as width the lenticular pitch, on condition that the aperture of this objective be, slightly less or at most, equal to that of the lenticular diopters.

The recording in a more or less great number of elementary chambers of the original, of each of the points of the image space constructed by the objective, is represented on the emulsion by a sum of spots equal to that number, the pitch of which is larger or smaller than that of the elementary chambers according to whether the image point considered is constructed in front of or behind the lenticulation. The reversing of the elementary images with respect to their width also reverses the relation of the pitch of these spots to that of the elementary chambers, and, consequently, results in the reversing of the relief from the original film to the copied one. A point of the image space constructed by the taking objective of a camera operating for instance in station is actually, relatively to the focusing plane of the object, the image of a point of the object space situated beyond this plane (the infinite for instance) or on this side, according to whether this image point is situated geometrically between the film and the objective, i. e., in front of the lenticulation or farther off than the film, i. e., beyond its emulsified surface. The film developed and observed from the lenticulation side thus represents the incorrect, i. e., reversed relief of this space, since the distant planes of the photographic object are reconstructed in front of the lenticulation and the first planes behind the film plane; contrary to the order they naturally had. The light beams building these points upon recording in the camera are all of them cones based on the exit pupil of the taking objective and they have for apexes these different image points in the image space.

Consequently, the microscopic spots which for each of these points are recorded in the elementary chambers of the lenticulation of the film, are firstly recorded in an increasing number of chambers as these image points are more distant from the plane of this film, and secondly, these spots are spaced on the emulsion at a larger or smaller pitch than the pitch of the lenticulation according to whether the angle at the top of the light cones causing them is itself larger or smaller than the angle at the top of the cones constructing in the same plane of the emulsion the images of the points of the focusing planes.

This means that the pitches of these microscopic spots are larger or smaller than the lenticular pitch according to whether the image points are between the film plane and the objective or beyond the film plane relatively to this objective. Consequently, any means of copying which will procure the sidewise reversal of the elementary images recorded on a lenticulated original film, will reduce the pitch of the microscopic spots on the copy beneath the pitch of the lenticulations on the film when the pitch of said spots on the original film was greater than that of the lenticulations and vice versa, bringing under the lenticular pitch the pitch of the smaller microscopic spots. It is the necessary and sufficient condition for the reversal of the true relief which when reversed on the original, for instance, will appear correctly on the copy.

The relief image thus taken with a view-taking apparatus in station on the original film being reversed, a copy of the same with correct relief may be obtained according to a first object of the invention which consists in placing in close contact with the gelatinized side of the original photograph, provided with its lenticular support, the emulsion side of an unexposed film or plate preferably not showing any lenticulation, and passing a narrow source of light in a uniform movement across the width of the "pupil" of the original photograph (i. e. in the space where appears relatively to this original photograph the exit pupil of the taking objective), to be effected transversely to the lines of its lenticulation whilst in a uniform movement and in the same period of time a relative sliding is effected between the sides in contact, less or at most equal in amplitude to twice the lenticular pitch, and making it in such a direction that the emulsion of the copy is imprinted all over its extent without leaving discontinuities between the copied elementary images or without producing overlappings.

Consequently, any developed copy or any other copy resulting therefrom by contact printing may be observed in correct relief by providing it with an appropriate selector of which the thickness, the curvature of the diopters and their pitches determine the depth of the relief as well as the width of the viewing pupil and its distance. On any geometrical drawing of the very enlarged section of a lenticulated film is immediately observed that when the lenticulation may be separated from the film which bears the elementary images, the substitution of a lenticulation (called here "selector") of a longer focal length than that which has served for recording these elementary images, but with the same pitch, procures an aerial construction of an image space homologous to that which has been recorded, but deeper than the recorded space if the focal length of this second selector is larger than that of the first; or more compact if the focal length is much smaller. Likewise, it is easy to see that if the pitch of the lenses of this second selector is larger, for a given focal length than that of the first selector, and in the extreme case, if it is equal to the pitch of the elementary images borne by the film to be observed, the image of the exit pupil of the projection objective recorded in the space by the film, is rejected farther off than its recording distance, and in the extreme case to the infinite.

According to a second object of the invention from an enlargement obtained upon a non-lenticulated support of the recorded reversed relief image, copies may likewise be made by contact printing, recording the correct relief on condition of proceeding, whilst copying, with the relative sliding described above, and taking care that this enlargement be provided with a selector of corresponding pitch. The satisfactory observation of this copy, or of any other copy obtained upon a non-lenticulated support and originating therefrom by simple contact printing, occurs by providing it with a selector having pitches adapted to the pitch of their elementary images and of which the thickness and the curvature of the diopters contribute to determine the depth of the relief as well as the width of the viewing pupil and its distance.

The accompanying drawing, as a matter of example, facilitates the understanding of the case.

This drawing represents, on a very enlarged scale and along a plane perpendicular to the generating lines of the cylindrical lenticulation, a section of the developed lenticulated original and of a non-lenticulated emulsion support, in contact by their gelatinized sides for obtaining first copies by lighting with a mobile source of light.

In the figure, F is the original film lenticulated with a pitch $p$, E is the layer bearing the developed image, F′ is the non-lenticulated copy film, E′ is its unexposed emulsion layer in contact with the layer E. For a better understanding, in the drawing there is a very small interval between the two layers E and E′. At the distance $t$ of the film F which distance is very large in respect of $p$, D is a diaphragm delimiting the "central pupil" of the original lenticulated film, i. e. as already explained the aerial image of the emergency pupil of the objective having served at the exposure. A light source S, punctual or linear perpendicular to the plane of the figure, uniformly moves across the width $l$ of the diaphragm D for simultaneously lighting by scanning—in the direction indicated for instance by the arrow and on the exact width of each of them—all elementary images of the layer E as is well known.

Supposing the pupil of the original film is constructed in front of the lenticulation, the pitch of the elementary images which is almost equal to that of $p$ is nevertheless larger than $p$. The relation of these pitches is namely function of the value of $t$.

The contact copy printing of E upon E′ without relative sliding between the two layers can only lead to an identical reproduction on E′ and to a same pitch, almost equal to that of $p$, of the elementary images borne by E. If a movement of uniform relative sliding is set up between the layers during copying, perpendicularly at the generating lines of the cylindrical lenticulation, it is evident, on the one hand, whatever the amplitude of this movement and its direction may be, that the source S mobile in the opposite direction of the arrow during this sliding, produces at each moment of its progress simultaneously on all elementary images of E and from one edge (1) to the other (2) of each of them—the lighting of homologous points (i. e. points situated at distances always equal to the pitch of these elementary images) and that these points are simultaneously reproduced on the emulsion E′ of the copy. On the other hand, if the relative movement between the two layers E and E′ occurs by movement of F′ in the direction of the arrow, F being maintained immobile, and if the movement equals the image pitch, almost equal to that of $p$—the simultaneous lighting by scanning in the direction of the arrow of all elementary images borne by E occurring during the progress of S, from their edge (1) to their edge (2), it is evident that the point (0) of E′ which was opposite to (1) at the moment of the start of the path of S going from R to U, moment which coincides with the beginning of the sliding of F′ on F, will be at the end of the path of S and of F′ opposite to point (2) of E, and that during the whole duration of copying, it is the sole point (0) of each elementary image of the copy which has been reproduced on E′. When developing the film F′, E′ will show a linear image composed of parallel lines passing through these points having almost the same pitch as that of $p$, each of these lines being the summation on it of all of the infinitely narrow and contiguous linear images, composing each elementary image of E.

Thus there is between the lines of this linear image, a discontinuity which is a maximum in this case since its width is practically the same as that of the pitch of the lines of this image.

This discontinuity decreases when the distance of the sliding increases in the same direction and it is for a value of the relative sliding of the layers E and E′ equal to $2p$ or almost equal to $2p$ that the elementary images recorded on E′ have a width about the same as that of $p$ and that they are reversed in their width in respect of the elementary images borne by E.

In fact, whilst S goes along $l$ in inversed direction of the arrow, and all the chambers of F are simultaneously scanned in the direction of the arrow from their edge (1) to their edge (2), the point (0) of E′ which f. i. was opposite to the point (1) of the elementary image on E at the moment of lighting this point (1), has come in (1′) at $2p$ farther in the direction of the arrow when the point (2) at the end of the path of S is lighted on E and reproduced in (2′) on E′. The elementary image which goes from (1) to (2) on E is thus reversed in the course of copying and extends from (1′) to (2′) on E′. The same applies for all elementary images of E reproduced on E′. As these images follow each other on E′, at a pitch almost equal to that of $p$ for their homologous points, in case the sliding equals $2p$, the elementary images on E are joined end to end without overlapping in the same way as the elementary images of E.

The relative sliding of the value $2p$ in the appropriate direction thus effects, when observing the copy with the aid of an appropriate selector, the reversing of the relief of the original support.

I claim:

1. Method for copying in correct relief an original lenticulated film on which reverse relief is recorded in the form of multiple striated elementary, closely juxtaposed, images, consisting in placing a light-sensitive film with its emulsion side in contact with the said elementary images of the original film, the step of scanning by means of a light source simultaneously and methodically with uniform speed, transversally with respect to the lenticulations, all the elementary images over their whole width, thereby copying them, said light source moving at a great distance in front of the lenticulations compared with the pitch of the lenticulations i. e. in a space where appears the exit pupil of the taking objective, and effecting meanwhile a relative sliding between both said film surfaces in contact, which results in a translation of the film copy over a distance which closely equals up to twice the value of the elementary image pitch, in the same direction as that of the scanning light on the elementary images.

2. Method for copying in correct relief an original lenticulated film on which reversed relief is recorded in the form of multiple striated elementary, closely juxtaposed, images, consisting in placing a smooth light-sensitive film with its emulsion side in contact with the said elementary images of the original film, the step of scanning by means of light source simultaneously and methodically with uniform speed, transversally with respect to the lenticulations, all the elementary images over their whole width, thereby copying them, said light source moving at a great distance in front of the lenticulations compared with the pitch of the lenticulations i. e. in a space where appears the exit pupil of the taking objective, and effecting meanwhile a relative sliding between both said film surfaces in contact, which results in a translation of the film copy over a distance which closely equals up to twice the value of the elementary image pitch, in the same direction as that of the scanning light on the elementary images.

3. Method for copying in correct relief an original lenticulated film on which reversed relief is recorded in the form of multiple striated elementary, closely juxtaposed, images, consisting in placing a smooth light-sensitive film with its emulsion side in contact with the said elementary images of the original film, the step of scanning by means of a light source simultaneously and methodically with uniform speed, transversally with respect to the lenticulations, all the elementary images over their whole width thereby copying them, said light source being linear and moving at a great distance in front of the lenticulations compared with the pitch of the lenticulations i. e. in a space where appears the exit pupil of the taking objective, and effecting meanwhile a relative sliding between both said film surfaces in contact, which results in a translation of the film copy over a distance which closely equals up to twice the value of the elementary image pitch, in the same direction as that of the scanning light on the elementary images.

4. Method for obtaining a correct relief on an enlarged copy of a lenticulated film on which reversed relief is recorded in the form of multiple striated elementary, closely juxtaposed, images, consisting in the step of enlarging said multiple images on a smooth light-sensitive transparent support, the step of adapting a selector with a lenticulation pitch appropriate to the enlargement, the step of placing a light-sensitive film with its emulsion side in contact with the said elementary images of the enlarged copy, the step of scanning by means of a light source simultaneously and methodically with uniform speed, transversally with respect to the lenticulations, all the elementary images over their whole width, thereby copying them, said light source moving at a great distance in front of the lenticulations compared with the pitch of the lenticulations i. e. in a space where appears the enlarged image of the exit pupil, and effecting meanwhile a relative sliding between both said film surfaces in contact, which results in a translation of the film copy over a distance which closely equals up to twice the value of the elementary image pitch, in the same direction as that of the scanning light on the elementary images.

5. Method for finishing the contact copies or enlarged copies according to claim 1, permitting direct binocular viewing in relief, consisting in covering said copies with a selector having features appropriate to the pitch of the elementary images and with the distance and opening of the viewing pupil appropriate for viewing the said copies.

References Cited in the file of this patent

UNITED STATES PATENTS

| | | |
|---|---|---|
| 1,807,822 | Berthon | June 2, 1931 |
| 1,874,529 | Heymer | Aug. 30, 1932 |
| 2,138,097 | Heymer | Nov. 29, 1938 |
| 2,248,904 | Eggert et al. | July 8, 1941 |